No. 827,724. PATENTED AUG. 7, 1906.
F. HAMACHEK.
GUARD FINGER FOR MOWERS OR REAPERS.
APPLICATION FILED NOV. 21, 1904. RENEWED DEC. 26, 1905.
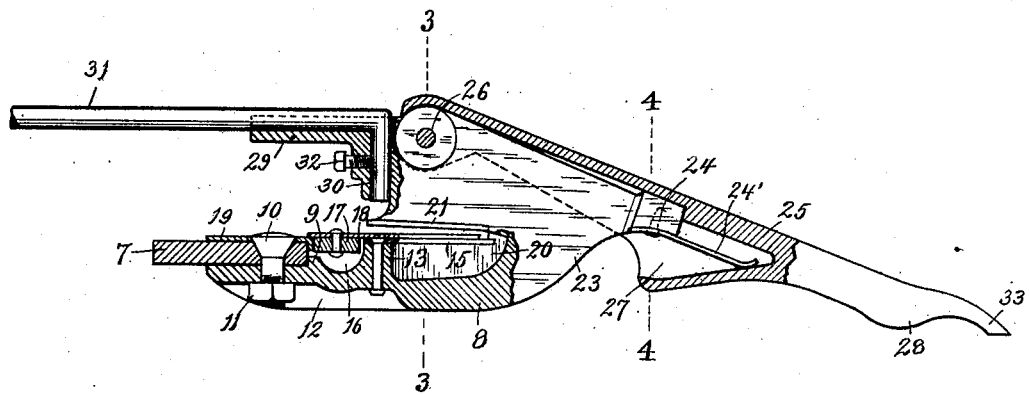
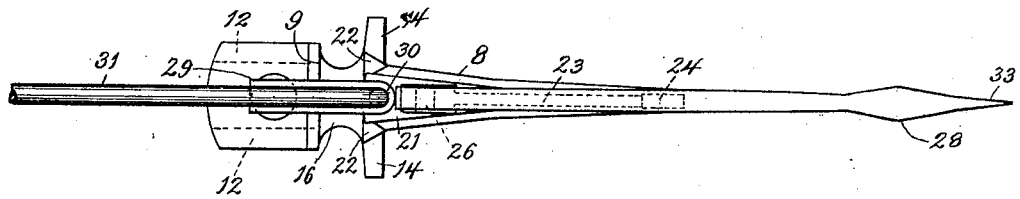
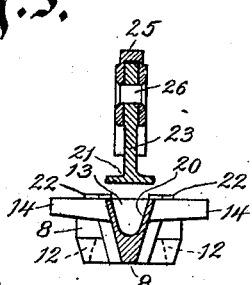
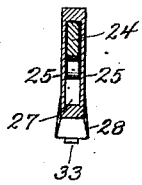
Witnesses
C. H. Keeney,
R. S. Caldwell.
Inventor
Frank Hamachek
By Benedict & Morsell
Attorneys.

UNITED STATES PATENT OFFICE.

FRANK HAMACHEK, OF KEWAUNEE, WISCONSIN.

GUARD-FINGER FOR MOWERS OR REAPERS.

No. 827,724.     Specification of Letters Patent.     Patented Aug. 7, 1906.

Application filed November 21, 1904. Renewed December 26, 1905. Serial No. 293,329.

*To all whom it may concern:*

Be it known that I, FRANK HAMACHEK, residing in Kewaunee, in the county of Kewaunee and State of Wisconsin, have invented new and useful Improvements in Guard-Fingers for Mowers or Reapers, of which the following is a description, reference being had to the accompanying drawings, which are a part of this specification.

This invention relates to guard-fingers for mowers or harvesters, and has for its object to provide a guard-finger which will follow the irregularities of the ground, and thus be particularly adapted for use with fallen or lodged grain or vines.

Another object is to produce such a guard-finger with a bending freely-swinging pointed front end adapted to always rest upon the ground and follow the irregularities thereof without digging deeply into it.

A further object of this invention is to provide a means for carrying the cut material to the rear of the cutting mechanism, and thereby prevent clogging of the cutting mechanism.

With the above and other objects in view the invention consists in the devices and parts or their equivalents, as hereinafter set forth.

Referring to the accompanying drawings, in which like characters of reference indicate the same parts in the several views, Figure 1 is a side elevation of a guard-finger embodying the present invention and attached to a cutting mechanism, parts being broken away to better illustrate the construction. Fig. 2 is a plan view of the guard-finger removed from the cutting mechanism. Fig. 3 is a transverse sectional view taken on the line 3 3 of Fig. 1. Fig. 4 is a transverse sectional view taken on the line 4 4 of Fig. 1, and Fig. 5 is a detail view of a modification.

In the drawings, 7 represents the finger-bar of a cutting mechanism which constitutes the support for the guard-fingers.

The guard-finger, as shown in Fig. 1, has a main or body portion 8, which is V-shaped in cross-section at its front end and which is enlarged and flattened at its rear end. Here it is provided with a rabbet formed by an upwardly-extending shoulder 9 to fit against the under side and front edge of the finger-bar 7, to which it is secured by means of a bolt 10 passing therethrough. The bolt 10 has its nut 11 beneath the rear end of the body portion 8 and protected from coming in contact with the ground by a pair of downwardly-extending side flanges 12 of the body portion 8, which merge with the rounded central bearing portion thereof.

A transverse upwardly-extending flange 13 stands in alinement with a pair of oppositely-extending side spacing-arms 14 to form a support for the lower cutting-teeth 15 of the cutting mechanism, and between this flange 13 and the shoulder 9 is formed a groove 16, through which the sickle-bar 17, carrying the upper cutting-teeth 18, is reciprocated. The cutting-teeth 18 bear upon the cutting-teeth 15 at their front portions and at their rear portions rest upon an angular bearing-plate 19, which is held to the finger-bar 7 by the bolt 10 and forms a thrust-bearing for the sickle-bar.

Ahead of the flange 13 the body portion 8 is provided with a recess 20, with an overhanging upper wall 21, and slotted side walls, through which the cutting-teeth 15 and 18 extend, the pointed end of the stationary lower cutting-tooth 15 being confined within said recess 20.

At the junction of the flange 13 with the side arms 14 there are provided triangular-shaped upwardly-extending lugs 22, with which the cutting-teeth 15 fit to be kept in their proper positions.

The front end of the body portion 8 tapers to an upwardly-extending web or plate 23, which continues rearwardly along the overhanging wall 21 of the recess 20, with an inclined upper edge terminating at its front in a slightly-enlarged head 24. A swinging member 25 has its under edge grooved at the rear portion thereof, so as to fit over the web 23, and at its extreme upper and rear end the side flanges formed by the groove just mentioned constitute ears, which are pivotally secured to the web 23 by means of a pivotal pin 26 in the nature of a rivet or the like.

The top portion of the movable member 25 above the pivotal pin 26 is rounded to conform to the rounded upper end of the web 23, and the movable member 25 is free to swing up and down upon the pivotal pin 26. The groove in the under edge of the movable member 25 terminates in a recess 27, the lower wall of which stands in the path of the head 24 of the web 23 during the swinging movements of the movable member, so that these movements are limited to the play of the head 24 within the recess. A leaf-spring 24' is riveted or otherwise secured to the head 24 and projects into the recess 27, bearing upon the lower wall thereof, so as to give the movable member a spring tendency to swing downwardly. It will thus be seen that the movable member 25 by its own weight and by the action of spring 24' swings to a position where its rounded bearing-surface 28, just back of its downwardly-arched or bent front point, rests upon the ground and keeps in touch with the ground during the movements of the machine with the point extending only slightly below the crust of the ground, notwithstanding the irregularities in the surface over which it travels. However, the extent of swing of the movable member is limited by the engagement of the head 24 either with the upper wall of the groove of the movable member or with the stop formed by the lower wall of recess 27, as the case may be, so that the movable member may not be swung out of place.

At the rear end of the web 23 just behind the pivotal connection of the movable member 25 therewith is an integral rearwardly-extending bracket 29, having a groove along the upper surface of its outstanding arm, which groove terminates in a downwardly-extending opening 30. A leading or side delivery-rod 31 is adapted to fit in the groove of the bracket 29 and has its angularly-bent end passed down through the vertical opening 30, where it is clamped in position by means of a set-screw 32, which is threaded through the bracket 29 into engagement with the rod 31. The object of the leading or side delivery-rod 31 is to deliver to one side the material which has been raised to said rod by the inclined upper edge of the movable member 25 during the forward movement of the machine. The rod 31 may extend as far to the rear as desirable for accomplishing the above object.

The front end of the movable member beyond the broadened rounded portion 28 is sharply pointed and arched, so that the point 33 thereof extends downwardly and terminates slightly below the level of said rounded portion 28 to travel just below the crust of the ground and scratch a small furrow, which is immediately covered again by the rounded portion 28. It is desired that the point should travel below the crust of the ground, so as to lift the grain or vines which have been beaten down; but it is important that the point should be prevented from digging deeply into the ground, and this is accomplished by the rounded bearing portion 28, which rides on top of the ground and limits the penetration of the point 33, however rough the surface of the ground may be.

It is within the purposes of this invention to provide the ordinary turned-up guard-finger point 34, as shown in Fig. 5, with the attachment to cause it to assume the shape of the guard-finger above described. This attachment is in the nature of a hood or cap 35, having a socket in its rear to fit over the turned-up point 34 of the guard-finger and having the arched downwardly-extending point 33' and rounded bearing portion 28' similar to the corresponding parts of the other construction. The cap 35 is adapted to be secured to the member 34 by means of a rivet 36 or the like. It is obvious that an attachment of this nature may be adapted to fit upon any other shaped guard-finger, such as a guard-finger as above described, when it has become worn.

From the foregoing it will be seen that the guard-finger of this invention by means of its pivoted portion may always have its front pointed end slightly entering the crust of the ground, but prevented from digging therein by means of the broadened rounded portion 28 bearing on the top of the ground, notwithstanding irregularities in the surface over which it travels. Therefore the guard-finger is always adapted to lift the fallen or lodged grain or vines by its arched pointed end and carry them by its inclined upper surface until they are cut by the cutting mechanism, when they are carried over the cutting mechanism and discharged in the rear thereof by means of the leading-rods 31.

The swinging member of the guard-finger avoids the necessity for inclining the cutting-teeth under any circumstances, permitting them to be always maintained in a horizontal plane whereby the grain or stubble is not twice cut, as when the tilting of the cutter-bar is made necessary in order to lower the points of the guard-fingers for fallen or lodged grain or vines.

Further, it will be observed that the novel features of the present invention are accomplished without presenting a projection or shoulder in the line of passage of the material which would be liable to gather material and form an obstruction; but, on the other hand, the device is made to assume practically the space occupied by the forms of guide-fingers in present use and is adapted to be interchangeable therewith, the method of attaching it to the finger-bar being designed for this purpose.

Another feature of considerable merit in a finger-guard for this class of work is that the web 23 presents an unbroken partition-wall extending from the inclined surface which is lifting the grain to the cutting mechanism, for without such a partition wall or web 23 a grain-head or seed-pod being raised by the inclined edge of the guard-tooth and sliding off from said inclined edge would be liable to fall beneath the inclined edge and hang in a position to be cut by the cutting mechanism or be passed over thereby; but with the partition wall or web 23 as described the grain-head or seed-pod is held up against drooping when it rides off from the inclined edge of the guard-finger and is thereby made to avoid direct contact with the cutting mechanism and be carried over the cutting mechanism so that its stem will be properly cut.

The enlarged head 24 at the front end of the web 23 permits of easily grinding the same to fit within the walls of the groove and recess of the movable member, so as to permit free movement of this member without horizontal play.

While the details of construction and arrangement as shown and described herein are at present preferred for the purpose of exemplifying this invention, it is obvious that the invention is not restricted thereto, but that various alterations and modifications may be made without departing from the spirit and scope thereof.

What I claim as my invention is—

1. A guard-finger, comprising a body portion capable of attachment to a cutting mechanism, a web extending upwardly from the body portion, an inclined movable member pivotally connected to the web, a bracket on the web having a groove in the upper surface of its outstanding arm and a downwardly-extending socket in connection therewith, a leading-rod fitting within the groove of the bracket and having an angularly-bent end entering the socket of the bracket, and a set-screw in the bracket for clamping the leading-rod, said leading-rod being adjacent to and near the same level as the rear end of the movable member.

2. A guard-finger, comprising a body portion having a rabbeted rear upper edge to fit the finger-bar of a cutting mechanism, means for securing the body portion to the finger-bar, an upwardly-extending transverse flange on the body portion, laterally-extending spacing-arms on opposite sides of the body portion in alinement with said flange, said body portion having a recess in advance of the flange with an overhanging top wall and slotted side walls, a cutting-tooth secured to the flange with its point contained within the recess, a sickle-bar located in a groove of the body portion between the flange and the finger-bar, an angular bearing-plate secured to the finger-bar against which the sickle-bar bears, a cutting-tooth on the sickle-bar resting its front part on the first-named cutting-tooth and its rear part on the bearing-plate, a web extending upwardly from the body portion and overhanging the upper wall of the recess, and a movable member pivoted to the web.

3. A guard-finger, comprising a body portion having a rounded tapering bearing-surface, a pair of parallel depending bearing-flanges merging with the bearing-surface, and a securing means for attaching the body portion to the finger-bar of a cutting mechanism and located between the depending flanges.

4. A guard-finger, comprising a body portion having means for attachment to the finger-bar of a cutting mechanism, an upwardly-extending part on the body portion, and an inclined member movably mounted upon the upwardly-extending part and having a laterally-enlarged rounded bearing portion adapted to rest on the ground with a clear space to the rear thereof and provided with an arched downwardly-extending point in advance thereof with its inclined end extending below the level of the rounded bearing portion.

5. A guard-finger, comprising an inclined movable member having a laterally-enlarged rounded bearing portion adapted to ride on the surface of the ground with a clear space at the rear thereof and provided with an arched point in advance thereof and an inclined knife-edged front end extending to a lower level than the rounded bearing portion.

6. In combination with a guard-finger having a movable member, a cap adapted to fit on the end of the movable member and provided with a laterally-enlarged rounded bearing portion to ride on the ground and an arched tapering point in advance thereof with a front end extending to a lower level than said rounded bearing portion.

7. An attachment for a guard-finger comprising a cap having a socket to fit on the end of the guard-finger and provided with a rounded laterally-enlarged bearing portion to bear on the ground and an arched tapering point in advance of the bearing portion with an inclined knife-edged front end extending lower than the rounded bearing portion.

8. In a guard-finger, a body portion capable of attachment to a finger-bar of a cutting mechanism, an upwardly-extending web on the body portion, a movable member grooved to receive the edge of the web and provided with a recess, a pivot-pin passing through the web and the movable member and constituting a pivotal mounting for the movable member, an enlarged head on the front end of the web projecting into the recess of the movable member to engage the walls thereof and guide and limit the movements of the movable member, and a spring secured to the head and extending in advance thereof to bear upon the bottom wall of the recess.

9. In a guard-finger, a body portion having a rabbeted rear upper edge to fit the finger-bar of a cutting mechanism, means for securing the body portion to the finger-bar, an upwardly-extending transverse flange on the body portion, said body portion having a recess in advance of the flange with an overhanging top wall and slotted side walls, a cutting-tooth secured to the flange with its point contained within the recess, a web extending upwardly from the body portion and overhanging the upper wall of the recess, and a movable member pivoted to the web.

In testimony whereof I affix my signature in presence of two witnesses.

FRANK HAMACHEK.

Witnesses:
V. H. JANDA,
ARNA B. SCHMITZ.